June 30, 1970  P. GLADIEUX  3,518,521
ELECTRIC CIRCUIT SYSTEM FOR CONTROLLING THE SPEED OF
A D.C. MOTOR AND OF AT LEAST ONE ACCESSORY THEREOF
Filed July 6, 1966  4 Sheets-Sheet 1
F I G. 1
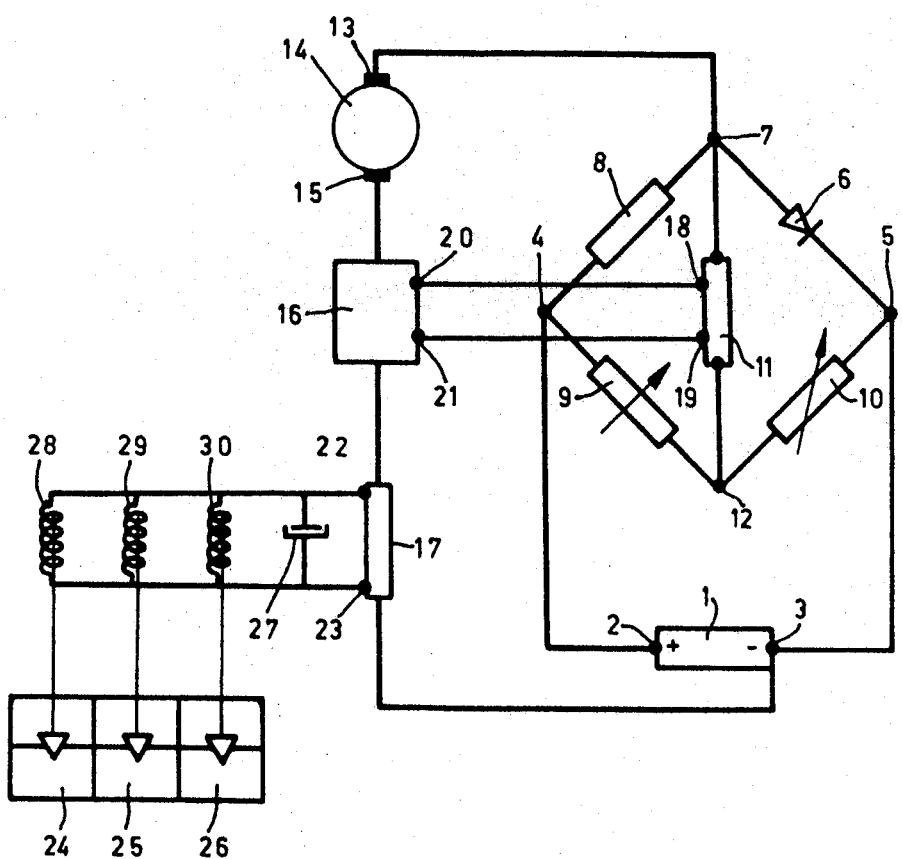

FIG.2

June 30, 1970 P. GLADIEUX 3,518,521
ELECTRIC CIRCUIT SYSTEM FOR CONTROLLING THE SPEED OF
A D.C. MOTOR AND OF AT LEAST ONE ACCESSORY THEREOF
Filed July 6, 1966 4 Sheets-Sheet 3

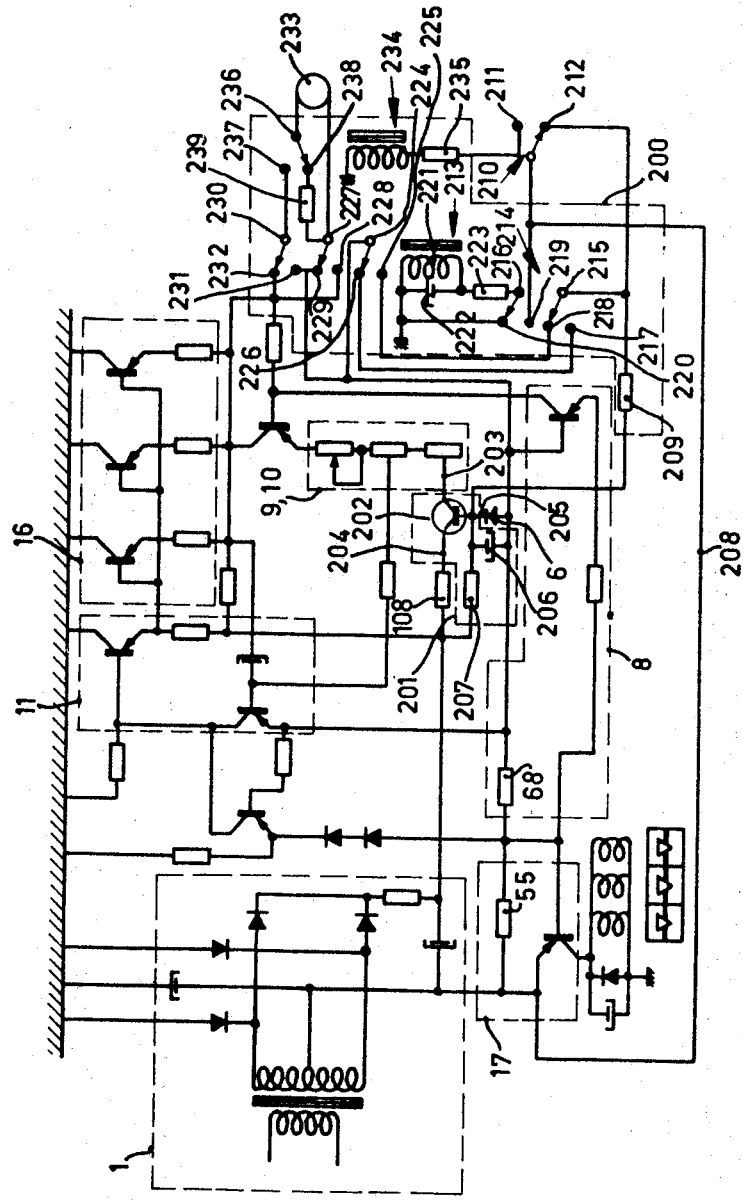

United States Patent Office 3,518,521
Patented June 30, 1970

3,518,521
ELECTRIC CIRCUIT SYSTEM FOR CONTROLLING THE SPEED OF A D.C. MOTOR AND OF AT LEAST ONE ACCESSORY THEREOF
Pierre Gladieux, 1 bis Rue St. Modard, Guise, Aisne, France
Continuation-in-part of application Ser. No. 403,576, Oct. 13, 1964. This application July 6, 1966, Ser. No. 563,115
Claims priority, application France, July 6, 1965, 23,715
Int. Cl. H02p 5/06
U.S. Cl. 318—332          4 Claims

ABSTRACT OF THE DISCLOSURE

An electric circuit system for controlling the speed of a shunt wound motor and at least one of its accessory such as a manually held dental instrument, includes a Wheatstone bridge fed by a supply of D.C. current, a resistance in one arm of the bridge, the arm being passed by a motor current, means for producing adjustable reference voltage in an arm on the side of a diagonal of the bridge opposite the first arm, an amplifier in the other diagonal of the bridge for amplifying the voltage drop across this diagonal, a regulator controlled by the output of the amplifier and connected in the motor circuit, a detector controlled by the current in the motor circuit and means controlled by the detector for starting the accessory whenever the current rises above a predetermined value.

---

This application is a continuation-in-part of application Ser. No. 403,576 filed Oct. 13, 1964, now abandoned.

My invention has for its object an electric circuit for adjusting the speed of revolution of a DC motor which may be used for instance for controlling a small manually carried electric instrument and also for controlling accessories which may be associated with such a hand-carried instrument.

My invention has also for its object the adjustment of motors serving for operations executed by a dentist or stomatologist, or else for driving any tool coupled with the motor.

Generally, such hand-operated instruments are controlled by DC motors of a reduced power such as miniature motors. The latter have the drawback that they have only a reduced yield when they run within the range of their maximum torque or in the vicinity of their maximum torque. For such reasons, miniature motors are generally used with a nominal power which is larger than that which is actually required. This solution is of course hardly satisfactory, chiefly by reason of the increase in size necessitated by the added power, said size leading also to an increase in weight of the motor.

A further drawback of the miniature motors used hitherto of the type considered consists in that they are not provided in general with adjusting means which might allow an adjustment of the speed of revolution or the maintenance of a predetermined number of revolutions in the case of a variable load. This is very inconvenient for the operators and reduces the optimum range of use and the grade of operation of the hand-controlled instruments. This is particularly true in the case of the control of electric band-operated instrument for dental work.

Furthermore, it was necessary hitherto to control permanently the accessories required for dentists' instruments such as cooling means, spraying means and the like through control member independent of the actual motor driving the main instrument and this is also very inconvenient for the operator and may even make him less attentive to his work.

My invention has for its object to remove the drawbacks of the DC motors used hitherto, chiefly for hand-carried instruments and it provides a switching system for adjusting the speed of rotation of such motors, which requires no large space and which takes care simultaneously of the accessories of such instruments such as the cooling means for the motor or automatically inserts the rotary tool driven by the motor for a predetermined operative condition of the motor.

The solution of said problem is characterized according to my invention by a Wheatstone bridge fed with DC for a comparison between a voltage proportional to the current fed to the motor and a reference voltage, the comparison being made for a predetermined definite range of operations of the motor, while an amplifier which is inserted in the diagonal of the bridge produces an output signal as a function of the difference between the current received by the motor and the above-mentioned reference value, said signal being fed to a regulator controlled by said output signal of the amplifier, which regulator is inserted in the circuit feeding the motor, a detector fed with the motor current being adapted upon increase of the current feeding the motor above a predetermined threshold value, to actuate at least one adjusting member which starts the operation of the above-mentioned accessories.

Preferably, said adjusting member is constituted by an electromagnetically controlled valve which opens the way for a cooling medium, for instance cooling air.

My invention is illustrated with further detail hereinafter, reference being made to the accompanying drawings wherein:

FIG. 1 is a wiring diagram illustrating the principle of the invention.

FIG. 2 is a more detailed wiring diagram of an electric switching system adapted to adjust the speed of revolution of a DC motor.

FIG. 4 is a complete electrical diagram of the embodiment shown in FIG. 3;

Figure 3:
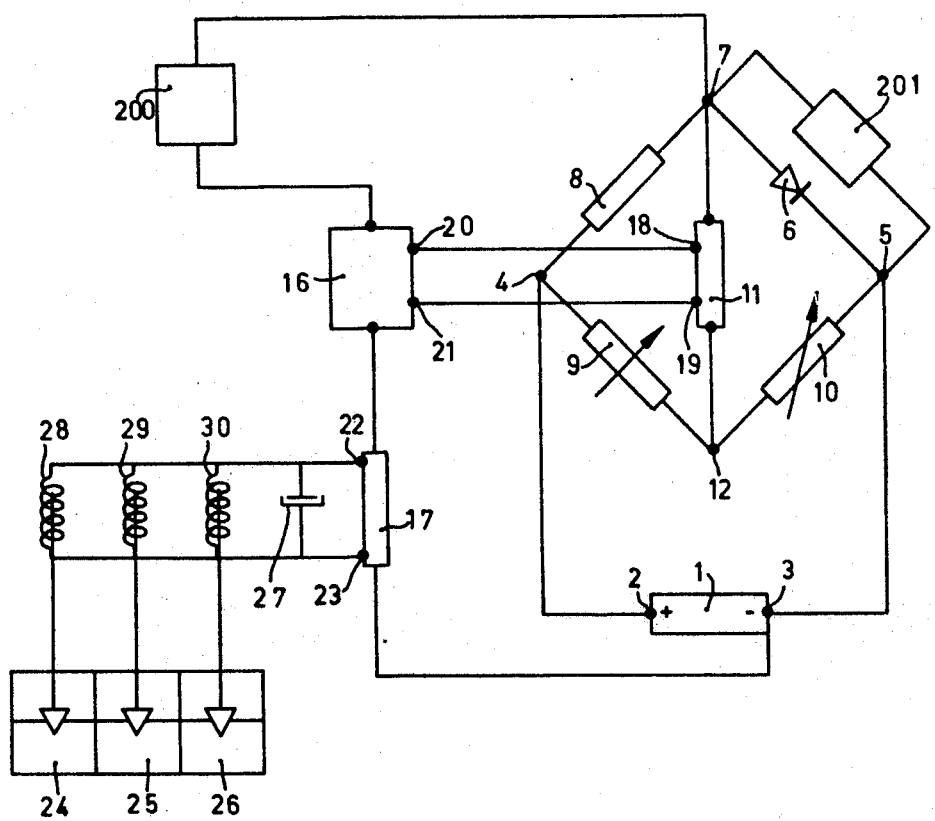
FIG. 3 is a schematic view showing the principle of a modified circuit according to the invention.

Turning to FIG. 1, the supply of a D.C. is connected through its positive terminal 2 with the input terminal 4 of a Wheatstone bridge, while its negative terminal 3 is connected with the other terminal 5 of the Wheatstone bridge.

In the arm of the bridge which extends between one input terminal 5 and the output terminal 7 is inserted a Zener diode 6. In the adjacent bridge arm i.e. between the other input terminal 4 and the above-mentioned output terminal 7 is inserted an adjustable resistance 8. In each of the other bridge arms is inserted an adjustable resistance 9 or 10. Between the output terminal 7 which is common to the Zener diode 6 and the resistance 8 and the output terminal 12 common to the two resistances 9 and 10, there is inserted in the bridge diagonal an amplifier 11 whose output terminals 18 and 19 are connected with the input terminals 20 and 21 of a regulator 16.

The D.C. motor 14 to be adjusted is connected through one of its terminals 13 with the said output terminal 7 of the bridge and through its other terminal 15 with the negative terminal 3 of the DC supply 1, with the insertion therebetween of said regulator 16 and of a detector 17 inserted in series with the motor and with the regulator.

Figure 2:
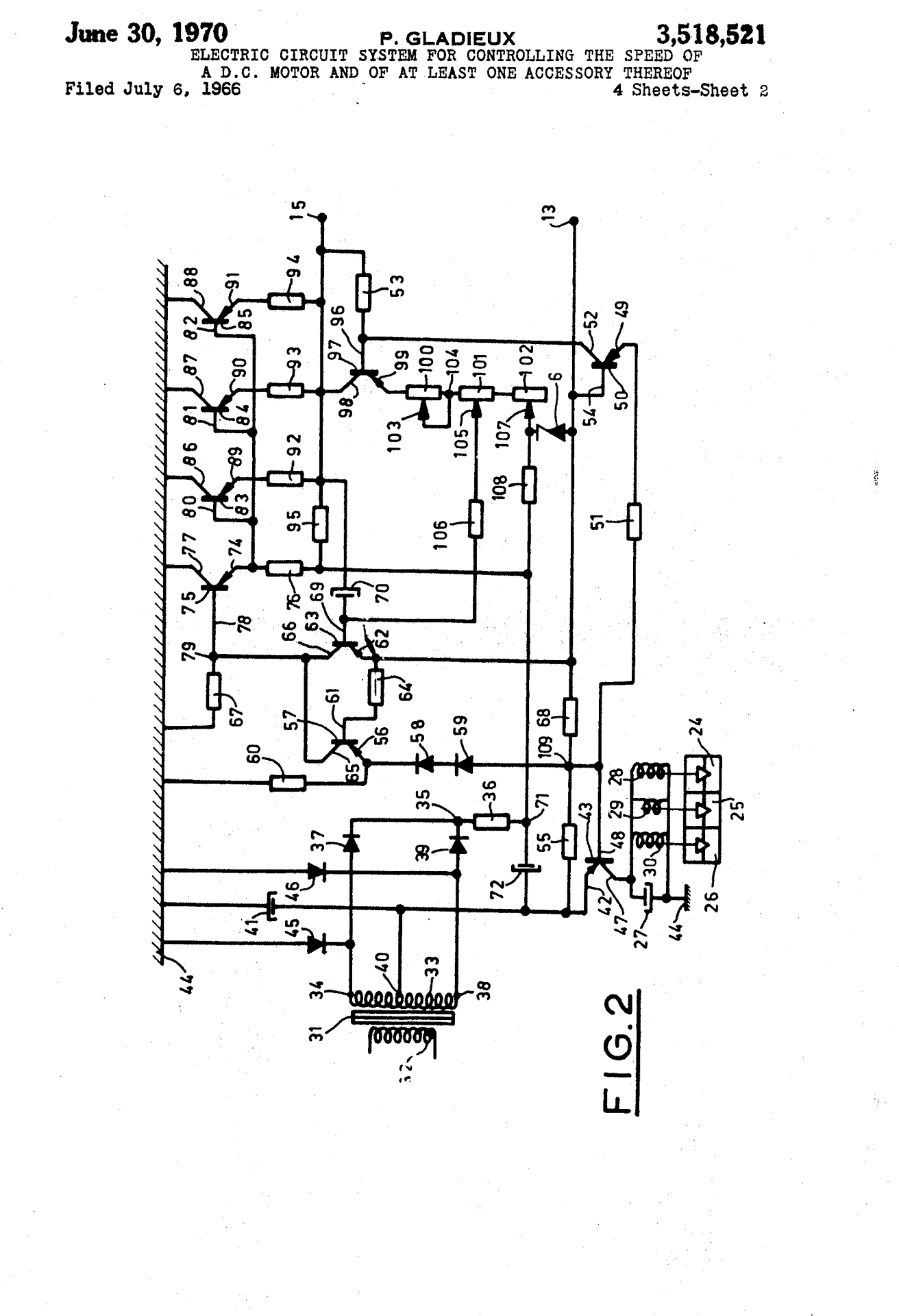

The detector 17 designated hereinafter also as an electronic switch is connected through its output terminals 22 and 23 with a control system actuating three electromagnetic valves 24, 25 and 26, the operation of said control system being illustrated hereinafter with reference to FIG. 2.

In the embodiment disclosed, said control system includes a condenser 27 inserted in parallel with the output terminals 22 and 23 of the electronic switch 17 and three windings 28, 29 and 30 inserted in parallel with the condenser and associated with the above-mentioned electromagnetically controlled valves 24, 25, 26. The motor 14 is fed by the DC supply 1 through the following circuit terminal 2 of said supply, bridge resistance 8, motor terminals 13 and 15, regulator 16, electronic switch 17 and the other terminal 3 of the supply.

The Zener diode 6 serves as a voltage stabilizer ensuring a constant drop in voltage between its two electrodes independently of the magnitude of the current intensity flowing through the diode; said Zener diode 6 is inserted in the bridge arm in a manner such that the Wheatstone bridge may feed the difference between the drop in voltage across said diode and the drop in voltage across the resistance 8 in the adjacent bridge so as to obtain their comparison. The drop in voltage across the resistance 8 is proportional to the current absorbed by the DC motor 14.

The adjustable resistances 9 and 10 in the other arms of the bridge are adjusted in a manner such that the Wheatstone bridge is in equilibrium for a predetermined operative range of the motor 14, for instance, under idling conditions.

When the idling motor is subjected to a loading torque applied to its shaft, the absorption of current by said motor increases and consequently also the drop in voltage across the bridge resistance 8. The bridge is consequently no longer in equilibrium and current flows in the bridge diagonal 7–12 through the amplifier 11 therein. Thus, the current flowing through the amplifier is exactly proportional to the increase in the motor current.

The regulator 16 is controlled by the amplifier 11 in a manner such that it produces a voltage proportional to the increase in the current absorbed by the motor and the regulator provides for a compensation of the ohmic loss arising by reason of the inner resistance of the motor and consequently it ensures maintenance of the speed of revolution of the motor at a predetermined constant value.

When the motor current rises above a predetermined value and thus the electronic switch 17 is subjected to a corresponding current, then said switch feeds the control system for the electromagnetic valves. The electronic switch 17 may be designed for instance in a manner such that when the motor is energized, the idling current feeding the latter is sufficient for closing the switch 17 and consequently for feeding current into said control system.

FIG. 2 illustrates a complete wiring diagram according to the invention. The feeding of the whole arrangement is provided by the primary 32 of a transformer 31 connected with the AC mains, the secondary 33 of said transformer being provided with three tappings 34, 38 and 40. The first tapping 34 is connected through a rectifying diode 37 with one terminal 35 of a resistance 36 while the second tapping 38 of the transformer secondary 33 is connected through a rectifying diode 39 with the same resistance terminal 35. The medial tapping 40 of the secondary winding 33 is connected on the one hand with a condenser 41 of which the opposite electrode is grounded at 44 and on the other hand with the terminal 42 of a pnp transistor 43. A further diode 46 is inserted between the terminal 38 of the secondary and the ground 44.

The collector 47 of the said transistor 43 which corresponds to a portion of the detector 17 or electronic switch illustrated in FIG. 1, is inserted at the input of the control system for the electromagnetically controlled valves 24, 25 and 26, which system includes as in the case of the wiring diagram of FIG. 1 a condenser 27 and three windings 28, 29 and 30 inserted in parallel with the latter.

The other terminals of the condenser 27 and of the windings are grounded (earthed) at 44.

The base 48 of the transistor 43 is connected through a resistance 51 with the emitter 49 of a pnp transistor 50 of which the collector 52 is connected through a resistance 55 with one terminal 15 of the DC motor which is not illustrated. The base 54 of the transistor 50 is connected with the other motor terminal 13.

The emitter 42 and the base 48 of the first mentioned transistor 43 are interconnected through a resistance 55. The base 48 is furthermore connected through the two rectifying diodes 58 and 59 with the emitter 56 of a further pnp transistor 57. The emitter 56 is connected through the resistance 60 with the ground at 44. The base 61 of the transistor 57 is connected through a resistance 64 with the emitter 62 of a pnp transistor 63 while the collector 65 of the transistor 57 is connected in its turn on the one hand through a resistance 67 with the ground and, on the other hand with the collector 66 of the transistor 63.

Between the base 48 of the transistor 43 and the emitter 62 of the transistor 63, is inserted a resistance 68. The base 69 of the transistor 63 is connected through a condenser 70 with the above-mentioned motor terminal 15.

The other terminal 71 of the above-mentioned resistance 36 is connected through a condenser 72 with the medial tapping 40 of the secondary 33 of the transformer 31 and furthermore through a resistance 76 with the emitter 74 of a pnp transistor 75 of which the collector 77 is connected with the ground at 44 while its base 78 is connected with the terminal 79 serving in common for the above-mentioned resistance 67 and for the collectors of both transistors 57 and 63.

Between the above-mentioned tapping 40 and the ground 44 is inserted a rectifying element 73.

The emitter 74 of the transistor 75 is connected with the bases 80, 81 of three pnp transistors 83, 84, 85 of which the collectors 86, 87 and 88 are all grounded at 44. The emitters 89, 90 and 91 of said transistors 83, 84, 85 are connected through resistances 92, 93, 94 with the motor terminal 15. A resistance 95 connects said motor terminal 15 furthermore with the terminal 71 of the above-mentioned resistance 36.

The collector 52 of the transistor 50 is connected with the base 96 of a further pnp transistor 97 whose collector 98 is also connected with the motor terminal 15, while its emitter 99 is connected through the adjustable resistances 100, 101 and 102 and through the diode 6 (shown in the wiring diagram of FIG. 1) with the other motor terminal 13. The above-mentioned resistances 100, 101 and the diode 6 are inserted in series.

The resistance 100 is adjustable and constitutes a rheostat whose slider 103 is connected with the point 104 connecting the successive resistances 100 and 101. The shiftable slider 105 of the also adjustable resistance 101 is connected through a resistance 106 with the base 69 of the transistor 63. The slider 107 for the adjustable resistance 102 is connected on the one hand with one electrode of the diode 6 and on the other hand through a resistance 108 with the terminal 71 of the above-mentioned resistance 36.

The other electrode of the diode 6 is connected with the motor terminal 13 as in the case of the wiring diagram according to FIG. 1.

The connections for the diode 6 are such that it may be fed with the current which flows from the slider 107 on the resistance 102 towards the motor terminal 13.

The diode 37 is fed with the current flowing from the transformer terminal 34 towards the terminal 35 of the resistance 36. The diodes 39, 45 and 46 are fed with currents flowing from the transformer terminal 38 towards said resistance terminal 35, from ground 44 towards the transformer terminal 34 and from the ground 44 towards the transformer terminal 38 respectively. The diodes 58 and 59 inserted in series are fed by a current flowing from the terminal 109 connecting the resistances 55 and 68 towards the emitter 56 of the transistor 57.

The DC motor, the terminals of which are shown at 13 and 15 receives a current which flows through the following circuit ground 44, transistors 83, 84 and 85, resistances 92, 93, 94, the motor between its terminals 15 and 13, resistance 68, resistance 55, medial tapping 40 of the secondary winding 34 of the transformer 31.

The following relationship appears between the wiring diagrams of FIGS. 1 and 2; the resistance 8 of the Wheatstone bridge (FIG. 1) is replaced in FIG. 2 by the resistance 68. The adjustable resistances 9 and 10 of the bridge correspond to the adjustable resistances 100, 101 and 102 of FIG. 2. The terminals 7 and 12 of the bridge according to FIG. 1 are constituted in FIG. 2 by the motor terminal 13 and by the slider 105 on the resistance 101, while the input terminals 4 and 5 of the bridge in FIG. 1 correspond to the terminal 109 between the resistances 55 and 68 and to the slider 107 on the resistances 102 according to FIG. 2. The amplifier 11 in the wiring diagram of FIG. 1 is constituted in the case of FIG. 2 by the transistors 63 and 75 inserted in series, the base 69 and the emitter 62 of the first transistor 63 being connected with the terminals of the bridge diagonal and the collector 66 of the transistor 63 being connected with the base 78 of the second transistor 75. Between the said base 69 of the transistor 63 and the slider 105 corresponding to the bridge terminal 12 is also inserted furthermore the resistance 106.

The regulator 16 illustrated in FIG. 1 is constituted in the case of FIG. 2 by the transistors 83, 84 and 85 inserted in parallel and connected through their bases 80, 81 and 82 with the output end of said amplifier, that is with the emitter 74 of the transistor 75.

The resistances 92, 93, 94 are selected in a manner such that the currents supplied by the different transistors are in equilibrium.

In the wiring diagram according to FIG. 2, the supply of energy of the whole arrangement is provided by the transformer 31 the output end of which is rectified by the diodes 37, 39, 45 and 46 arranged in bridge formation. Correspondingly, the terminals 2 and 3 of the DC supply according to FIG. 1, are equivalent to the terminal 35 of the resistance 36 associated with the medial tapping 40 on the transformer secondary. The electronic switch 17 according to FIG. 1 is replaced, in the case of FIG. 2, by the resistance 55 fed by the motor current associated with the transistor 43 controlled by the drop in voltage across said resistance 55, said resistance being inserted between the base and the emitter of said transistor.

The sliders 103, 105 and 107 on the resistances 100, 101 and 102 are adjusted in a manner such that the associated resistances have values which ensure equilibrium of the Wheatstone bridge formed by them within a predetermined range of operation of the motor. For instance, said range of operations may be that corresponding to the idling operation of said motor. In such a case, the electronic switch constituted by the resistance 55 and the transistor 43 is designed in a manner such that the idling motor current passing through the resistance 55 is sufficient for bringing the transistor 43 into its conductive condition so as to obtain a sufficient preliminary voltage drop between the base 48 and the emitter 42 of said transistor.

When the motor is under load, the current absorbed by it increases and there appears across the terminals of the resistance 68 fed by the motor current a corresponding difference in voltage. The latter is transmitted to the base 54 of the transistor 50 which supplies thenafter a correspondingly high collector current. This collector current produces across the resistance 53 a proportional drop in voltage which, in its turn, increases the preliminary voltage on the base 96 of the transistor 97 and is correspondingly amplified by said transistor 97. The emitter collector currents governed by said preliminary voltage in the transistor 97 destroys the equilibrium of the bridge so that now a current flows through the resistance 106 and this current makes the transistor 63 more or less conductive. The collector current from the transistor 63 is still further amplified by the transistor 75 inserted in series beyond said transistor 63 and the current obtained in fed into the input of the regulator. In other words, the bases of the transistors 83, 84 and 85 receive a corresponding preliminary voltage.

Thus, the transistors 83, 84 and 85 act through their more or les conductive condition, in a manner such that the voltage across the motor terminals is increased by an amount which is proportional to the amplification of the current absorbed by the motor under load so that the speed of revolution of the motor is held at a constant value.

At the same time, the difference in potential appearing across the terminals of the resistance 55 brings the transistor 43 into a conductive condition, assuming that said transistor has not been already operated by the idling current and responds only for a predetermined current produced by the load. As soon as the transistor 43 becomes conductive, the windings 30, 29 and 28 are fed with current and the electrically controlled valves 24, 25 and 26 become operative.

One of said electrically controlled valves or the like members, say that shown at 24 controls the input of cooling air. The two other valves 25 and 26 open on the other hand the input of water and of air to a spray system so that the starting of said sprayer is obtained through a further control signal. The switching system adapted to produce said control signal which may be incorporated with the atomizing system has not been illustrated. When the DC motor is subjected to a very high torque produced by its load, which torque is larger than the maximum allowable torque, the current absorbed by the motor increases to a corresponding large extent and the difference in voltage across the resistance 68 fed by the motor current is then sufficient for bringing the transistor 57 into a conductive condition. The current passing out of the collector of the transistor 57 then produces a voltage drop across the resistance 67, whereby the output voltage is reduced to a small value and an operative protection is obtained for the feed circuit and the motor.

A suitable selection of the values of the resistances 68 and 51 allows matching the amplifying coefficient of the voltage feeding the motor in a manner such as may ensure the maintenance of a constant speed of revolution of the motor.

Through a modification of the adjustment of the slider 105 on the resistance 101, it is possible also to modify the speed of revolution of the motor in the manner desired.

The wiring diagram described allows thus not only any desired modification in the speed of revolution of the motor, but also an automatic maintenance of the speed of revolution of the motor at a predetermined value, whatever may be the modifications in load and furthermore an automatic starting of the cooling system through an opening of corresponding electromagnetically controlled valves governed by the motor current, which valves control in their turn the admission of the cooling medium. At the same time the electronic switch energizing the electrically controlled valves may be designed in a manner such that the cooling system becomes operative as soon as the motor is energized by the current flowing through said motor when idle, or else, it may respond only in the presence of a higher current corresponding to a further predetermined operative condition of the motor.

Figure 5:
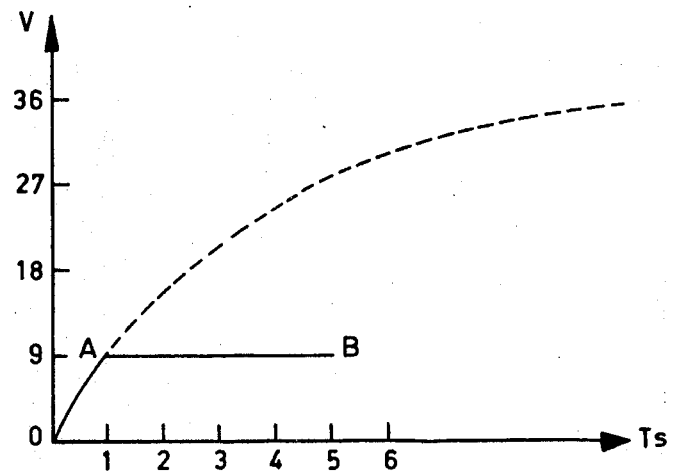
FIG. 5 is a charging curve for the condenser used in the circuit of FIG. 4.

FIGS. 3, 4 and 5 show a modification of the embodiment of FIGS. 1 and 2.

Micromotors in use are very sensitive to starting and to change in direction. When a voltage is applied to them, a peak current is induced which can attain five times the value of the permissible current and even more. A peak current of the same order of magnitude is produced during polarity change.

This strong current can cause the permanent magnets of the motor to lose their magnetism, which leads to an increase in the speed or rotation, an increase in the current used and a loss of torque on the motor shaft. Moreover, when the supply of the motor is interrupted, the latter continues to turn for a certain time which can provoke accidents.

The embodiment of the present invention shown in FIGS. 3, 4 and 5 is consequently concerned with improvements to the control circuit of FIGS. 1 and 2, which ensure protection of the motor upon starting, protection of the motor upon reversal of the direction of rotation, and which limit the dangers of accidents by ensuring a rapid stopping of the motor.

This embodiment is characterised in that the Wheatstone bridge is fed through a transistor of which the control of the bias voltage of the base is achieved by a Zener diode forming a branch of the bridge and a condenser connected in parallel between said base and a terminal of the motor, a resistance forming with said condenser a time-constant circuit which determines the duration during which said base bias voltage is maintained.

This embodiment is also characterised in that the control circuit of the motor comprises a reversing switch protected by a timing relay.

This embodiment is furthermore characterised in that a relay shuts off current to the motor during stopping in such a way that said motor becoming a generator delivers current to a resistance thereby reducing the time required for coming to a stop.

Referring now specifically to FIG. 3, a source of direct current 1 has a positive terminal 2 and a negative terminal 3 connected to terminals 4 and 5 of a Wheatstone bridge.

A Zener diode is inserted between terminals 5 and 7 of the bridge and a variable resistance 8 between terminals 4 and 7. Variable resistances 9 and 10 are inserted in the other two branches of the bridge. The amplifier 11 is mounted on the diagonal of the bridge between terminals 7 and 12.

Terminal 7 is connected to a control device 200 of the motor which will be explained later. The Zener diode is controlled by circuit 201. The control device 200 is linked to terminal 3 of source 1 by means of a regulator 16 and a detector 17 connected in series. Terminals 18 and 19 of amplifier 11 are connected to the input terminals 20 and 21 of regulator 16.

Terminals 22 and 23 of detector 17, also called "electronic connectors" are connected to the control device of three electric gates 24, 25 and 26; this control device comprises condenser 27 and three windings 28, 29 and 30.

Only devices 200 and 201 will be described below, the other constituents having been completely described with reference to FIGS. 1 and 2.

Referring to FIG. 4, the bridge 9, 10 is controlled by a transistor 202 of type NPN. Emitter 203 of transistor 202 is connected to bridge 9, 10 while its collector 204 is connected to a source 1 by means of resistance 108 which was described in FIG. 2. The Zener diode 6 is connected to the base 205 of transistor 202 and condenser 206 is connected in parallel to the terminals of this diode. Resistance 207 controls the charge of condenser 206. The assembly is fed by line 208 which for example is set to +36 v. The circuit is completed by resistance 209 which links base 205 of transistor 202 to switch 210 comprising operating terminal 211 and "stop" terminal 212.

When the voltage at the terminals of condenser 206 (curve of FIG. 5) reaches the voltage of diode 6 (point A) it does not increase any more and remains equal to 9 v. (point B). The supply functions normally it switch 210 is on the work position 211.

When switch 210 is on the stop position 212, the resistance 209, in series with resistances 55 and 68 (described in FIG. 2) discharges condenser 206. In this case, the voltage at the terminals of said condenser 206 is very small and transistor 202 no longer supplies the bridge. The output voltage of the supply decreases to a very low value.

When switch 210 goes from the stop position 212 to the work position 211, resistance 209 is disconnected and condenser 206 begins to charge according to the curve of FIG. 5. The bridge is fed through transistor 202 and the feed increases from zero to a value defined by the position of the variable resistance 10 of the bridge.

The necessary time for obtaining the imposed output voltage only depends on the time constant of the circuit formed by condenser 206 and resistance 207. In the example described, this time is of the order of one second.

There is thus obtained a delay for the putting into operation of the motor, which increases considerably its life span while avoiding the loss of magnetisation of its magnet.

When the polarity of the voltage on the terminals of the motor is rapidly reversed while the motor is not stopped, the motor behaves as a generator and gives an output opposite that of the supply. There is thus produced a peak current which can reach more than five times the normal current.

The circuit protects the motor during polarity change by using a time relay 213, the control of the change taking place through switch 214. Switch 214 comprises control terminals 215 and 216 and their terminals 217, 218, 219 and 220. The time relay comprises coil 221, condenser 222 and resistance 223.

Relay 213 comprises terminal 224 controlling terminals 225 and 226, terminal 227 controlling terminals 228 and 229 and terminal 230 controlling terminals 231 and 232. Terminals 225 and 230 are connected to the terminals of motor 233. The direction of connection is arbitrary and determines in the direction of rotation of motor 233.

If it is supposed that switch 210 is on the functioning position 211, the switch 214 is rocked to a position 216–219 and 215–217. A coil 221 of relay 213 will be fed, through resistance 223 and circuit 219–216, by a voltage coming from line 208 at +36 v. It is supposed that relay 213 remains stationary for a coil voltage of 22 v. The resistance proper of coil 221, resistance 223 and the capacity of condenser 222 produce for relay 214 a delay of the order of one second.

As soon as switch 214 has rocked, the circuit comprising resistance 209, terminals 215–217 and 226–224 causes a discharge of condenser 206; the voltage decreases to a very low value and maintains itself there while coil 221 of relay 213 has not reached a voltage of 20 v., which requires about one second. When relay 213 remains stationary, the following contacts are established 224–225, 227–228, and 230–231.

Terminals 227 and 237 cause the reversal of polarity of motor 233 but there is no more voltage at the terminals of 233 since a second ago and the rotor had the time to stop. Contact 224–225 is cut by opening terminal 218; resistance 209 is no longer in parallel on condenser 206 and the voltage begins to increase along the curve of FIG. 5. When the switch is rocked back to its original position, condenser 222 discharges in coil 221 and in resistance 223 which is in series on circuit 216–220.

There is thus obtained protection against loss of magnetisation of the permanent magnet of the motor during reversal of the direction of functioning during the functioning, by means of reversing switch 214, relay 213, condenser 222 and resistance 223.

When it is desired to stop the motor, the same continues to turn for a certain time which may reach several seconds.

To obtain a rapid stop of the motor, the invention provides the use of a relay 234, controlled by the operating terminal 211 of switch 210 with interposition of a resistance 235. The motor is fed through position 236–237 of relay 234, the position 236–238 being the position of rapid stop by means of the interposition of a resistance 239. When switch 210 passes on the stop position 212, relay 234 operates and the motor is no longer fed with current. It becomes a generator and feed and output voltage into circuit 236–238, resistance 239. By suitably selecting the value of resistance 239, the time for stopping is reduced to ⅕ of the normal stopping time.

It can be envisaged to give to resistance 239 a zero value but too high a current would cause a loss of magnetism of the motor. There is thus realised a circuit for rapidly stopping the motor which considerably reduces the risks of accidents.

Although the invention has been described with respect to two particular embodiments, it is understood that the same is in no way limited thereto and that there may be brought various modificaions of constiuents without departing from the spirit and scope of the invention. For example, the constitution of the elementary control circuits of the regulator, of the amplifier and of the electronic switch could be varied.

What is claimed is:

1. An electric circuit system controlling the speed of a shunt wound DC motor including a motor rotor circuit and at least one accessory for a small manually held instrument, comprising a Wheatstone bridge fed by a supply of DC current connected across one diagonal of said bridge, a resistance in one arm of the bridge, this arm being traversed by the motor rotor current, means producing an adjustable reference voltage in an arm of said bridge opposite said first arm, an amplifier inserted in the other diagonal of said bridge and adapted to amplify the drop in the voltage across said other diagonal, regulator means controlled by the output of said amplifier and connected in said motor rotor circuit outside of the bridge for maintaining said motor at a constant speed under varying loads, a detector controlled by the current in the motor rotor circuit and means controlled by said detector for actuating said accessory whenever the current rises above a predetermined value.

2. An electric circuit system controlling the speed of a shunt wound DC motor including a motor rotor circuit and at least one accessory for a small manually held instrument, comprising a Wheatstone bridge, fed by a supply of DC current, a first resistance in one arm of the bridge, this arm being traversed by the motor rotor current, a transistor having a base-emitter circuit in series with a second resistance, said circuit and said second resistance being in parallel with said first resistance in said one arm, means producing an adjustable reference voltage in an arm on the side of the diagonal of said bridge opposite said first arm, an amplifier inserted in said diagonal and adapted to amplify the drop in the voltage across said diagonal, said transistor detecting voltage drop change across said first resistance in said arm for controlling said amplifier, a regulator controlled by the output of said amplifier and connected in said motor rotor circuit outside of the bridge, a detector controlled by the current in the motor rotor circuit and means controlled by said detector for actuating said accessory whenever the current rises above a predetermined value.

3. An electric circuit system for controlling the speed of a shunt wound DC motor, including a motor rotor circuit and at least one accessory for a small manually held instrument, comprising a Wheatstone bridge, fed by a supply of DC current, said supply including a transistor adapted to supply current to the Wheatstone bridge, and in which a Zener diode is disposed in an arm of said bridge and connected to the base of said transistor to control the base bias voltage of said transistors, a condenser connected in parallel with the Zener diode between the base of said transistor and said motor, and a first resistance connected to said condenser and forming with said condenser a circuit having a time constant which determines the delay in the starting period until nominal voltage is reached, a resistance in one arm of the bridge, this arm being traversed by the motor rotor current, means producing an adjustable reference voltage in an arm on the side of a diagonal of said bridge opposite said first arm, an amplifier inserted in said diagonal and adapted to amplify the drop in the voltage across said diagonal, a regulator controlled by the output of said amplifier and connected in said motor rotor circuit outside of the bridge, a detector controlled by the current in the motor rotor circuit and means controlled by said detector for actuating said accessory whenever the current rises above a predetermined value.

4. An electric circuit system controlling the speed of a shunt wound DC motor including a motor rotor circuit and at least one accessory for a small manually held instrument, comprising a Wheatstone bridge, fed by a supply of DC current, a first resistance in one arm of the bridge, this arm being traversed by the motor rotor current, means producing an adjustable reference voltage in an arm on the side of a diagonal of said bridge opposite said first arm, an amplifier inserted in said diagonal and adapted to amplify the drop in the voltage across said diagonal, said amplifier including two transistors connected in series, the base and emitter of the first transistor being inserted in said diagonal, said second transistor being connected with the collector of the first transistor, a regulator controlled by the output of said amplifier and connected in said motor rotor circuit outside of the bridge, a detector controlled by the current in the motor rotor circuit and means controlled by said detector for actuating said accessory whenever the current rises above a predetermined value, a third transistor having its base-emitter junction connected in parallel with the said one arm of said bridge, a second resistor and a pair of diodes in series with said third transistor, said third transistor having its collector connected with the base of said second transistor of said amplifier and a third resistance connected intermediate said collector and said supply of DC current.

References Cited

UNITED STATES PATENTS

| | | | |
|---|---|---|---|
| 2,965,827 | 12/1960 | Hohne | 318—380 |
| 3,028,538 | 4/1962 | Rosenfeld et al. | |
| 3,241,042 | 3/1966 | Rosenfeld et al. | |
| 3,275,927 | 9/1966 | Kupferberg. | |
| 1,696,612 | 12/1928 | Rice | 310—53 |
| 2,975,308 | 3/1961 | Kilbourne et al. | 310—53 X |
| 3,303,411 | 2/1967 | Gately | 323—4 |
| 3,324,552 | 6/1967 | Saffir | 310—54 |

ORIS L. RADER, Primary Examiner

R. J. HICKEY, Assistant Examiner